(12) United States Patent
Seabright et al.

(10) Patent No.: US 9,223,764 B2
(45) Date of Patent: Dec. 29, 2015

(54) ASSISTIVE TECHNOLOGY FOR THE VISUALLY IMPAIRED

(71) Applicant: Open Text Corporation, Waterloo (CA)

(72) Inventors: Richard James Seabright, Oshawa (CA); Zhigang Li, Calgary (CA)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 14/595,982

(22) Filed: Jan. 13, 2015

(65) Prior Publication Data

US 2015/0128016 A1 May 7, 2015

Related U.S. Application Data

(63) Continuation of application No. 14/136,939, filed on Dec. 20, 2013, now Pat. No. 8,964,201, which is a continuation of application No. 13/045,347, filed on Mar. 10, 2011, now Pat. No. 8,619,272.

(60) Provisional application No. 61/322,774, filed on Apr. 9, 2010.

(51) Int. Cl.
*G06F 15/00* (2006.01)
*G06F 17/21* (2006.01)
*G06F 3/12* (2006.01)
(Continued)

(52) U.S. Cl.
CPC ............ *G06F 17/218* (2013.01); *G06F 3/1206* (2013.01); *G06F 3/1208* (2013.01); *G06F 3/1244* (2013.01); *G06F 3/1245* (2013.01); *G06F 3/1257* (2013.01); *G06F 17/245* (2013.01); *G06F 17/248* (2013.01); *G06F 17/2705* (2013.01)

(58) Field of Classification Search
CPC .... G06F 3/1206; G06F 3/1208; G06F 3/1244
USPC ........................................................ 358/1.13
See application file for complete search history.

(56) References Cited

U.S. PATENT DOCUMENTS

| 6,546,133 | B1 | 4/2003 | Temkin et al. |
| 6,934,909 | B2 | 8/2005 | Tewari |
| 8,619,272 | B2 | 12/2013 | Seabright et al. |

(Continued)

OTHER PUBLICATIONS

Ganza, Peter, "What's in a Name?", http://pganza.wordpress.com, Mar. 22, 2010, 5 pages.

(Continued)

*Primary Examiner* — Saeid Ebrahimi Dehkordy
(74) *Attorney, Agent, or Firm* — Sprinkle IP Law Group

(57) ABSTRACT

Disclosed are methods and apparatus for generating accessible documents. In one embodiment, an initial document in a print format is obtained. The print format of the initial document is identified as one of a plurality of print formats. A parser corresponding to the one of the plurality of print formats is applied such that the initial document is parsed according to the print format of the initial document. An intermediate document that conforms to an intermediate format is generated based upon results obtained from applying the parser. A template for converting the intermediate document into an accessible document is obtained. The template is then such that an accessible document corresponding to the initial document is generated, wherein the accessible document includes a plurality of tags that designate an order of a plurality of regions of the accessible document.

30 Claims, 4 Drawing Sheets

(51) Int. Cl.
*G06F 17/24* (2006.01)
*G06F 17/27* (2006.01)

(56) References Cited

U.S. PATENT DOCUMENTS

| | | | |
|---|---|---|---|
| 8,687,210 | B2 | 4/2014 | Sue et al. |
| 8,964,201 | B2 | 2/2015 | Seabright et al. |
| 2005/0125728 | A1* | 6/2005 | Peiro et al. .................... 715/523 |
| 2005/0160065 | A1 | 7/2005 | Seeman |
| 2005/0289182 | A1 | 12/2005 | Pandian et al. |
| 2007/0009161 | A1 | 1/2007 | Hollingsworth |

OTHER PUBLICATIONS

Assistive Technology, http://www.usft.com/article/Assistive-Technology, 2 pages.
Office Action for U.S. Appl. No. 13/045,347, mailed Mar. 15, 2013, 10 pages.
Office Action for U.S. Appl. No. 14/136,939, mailed Aug. 14, 2014, 5 pages.
Office Action for U.S. Appl. No. 13/107,723, mailed Jun. 6, 2013, 8 pages.

* cited by examiner

ASSISTIVE TECHNOLOGY FOR THE VISUALLY IMPAIRED

CROSS-REFERENCE TO RELATED APPLICATIONS

This application is a continuation of U.S. patent application Ser. No. 14/136,939 filed on Dec. 20, 2013, which is a continuation of U.S. patent application Ser. No. 13/045,347 (now issued as U.S. Pat. No. 8,619,272) filed on Mar. 10, 2011, which claims priority from U.S. Provisional Patent Application No. 61/322,774 filed on Apr. 9, 2010, which are incorporated herein by reference in their entirety.

BACKGROUND OF THE INVENTION

Today, 3.3 million Americans over the age of 40 are blind or have low-vision—a number that will surpass 5 million within the next decade. In addition, over 21 million Americans have profound visual impairments that require large print documents. A vast majority of these individuals have bank accounts, credit cards, and savings in various investment vehicles that require monthly statements. However, these individuals often are unable to access the financial statements that are typically provided.

Many visually impaired individuals use assistive technologies to access digital information. Such assistive technologies range from screen readers to Braille printers. However, many documents and websites are not designed to be compatible with assistive technologies.

The World Wide Web Consortium (W3C) has developed guidelines for technology products. These Web Content Accessibility Guidelines (WCAG) state that websites, software products and electronic documents should be built to work with assistive technologies.

Portable Document Format (PDF) is the most commonly used document format in electronic statements. However, this document format has presented one of the most problematic accessibility issues. A number of organizations have been working to address this issue by outlining the appropriate tagging requirements.

Currently, tagging of PDF documents is manually performed on a per-document basis. Unfortunately, this is a time-consuming and tedious process. There also fails to be a mechanism for tagging of documents that are stored in electronic formats other than PDF.

In view of the above, it would be beneficial if an improved process for tagging documents could be developed.

SUMMARY OF THE INVENTION

The disclosed embodiments support the generation of accessible documents. This may be accomplished through the execution of a template to convert one or more documents into accessible documents. This may be accomplished on a per-document basis, or as a batch process such that a plurality of documents are converted simultaneously.

In accordance with one aspect, an accessible document that is generated may include a plurality of tags, where the plurality of tags conform to a set of accessibility standards for generating documents compatible with an accessibility product for visually impaired individuals. For instance, the plurality of tags may designate an order of a plurality of regions of the accessible document, where the order indicates an appropriate read order for visually impaired individuals. The designated order of the plurality of regions of the accessible document may be different from an order of the plurality of regions of the initial document from which the accessible document was generated.

In accordance with another aspect, documents stored in various formats may be converted to accessible documents. More particularly, when an initial document is obtained, the format of the initial document may be identified as one of a plurality of formats. For example, the format of the initial document may be one of a plurality of print formats. A plurality of parsers may be available for parsing documents of any of the plurality of formats. Therefore, a parser corresponding to the identified one of the plurality of formats may be applied such that the initial document is parsed according to the format of the initial document. More particularly, the initial document may be parsed to identify a plurality of regions of the initial document.

In accordance with yet another aspect, an intermediate document that conforms to an intermediate format may be generated based upon results obtained from applying the parser. More particularly, a data structure or document such as a PDF document identifying each of the plurality of regions of the initial document may be generated. The intermediate document may also include additional information pertaining to the plurality of regions, such as the order of the plurality of regions in the initial document and information (e.g., text) in each of the plurality of fields/regions of the initial document.

In accordance with yet another aspect, the intermediate document may be converted into an accessible document through the use of a template. In the following description, the term "template" will be used to refer to a reusable component that includes computer-readable instructions for converting an intermediate document into an accessible document. In other words, the template may include the computer-readable instructions that are specific to tagging a document of a particular document type (e.g., bill type). The computer-readable instructions for converting an initial document into an intermediate document may not be specific to a particular document type (e.g., bill type). Rather, the computer-readable instructions for converting an initial document into an intermediate document may include instructions for parsing an initial document in a particular format (e.g., print format) to generate an intermediate document in an intermediate format (e.g., PDF). Since the instructions for converting an initial document into an intermediate document are not specific to the document type, these instructions need not be re-saved for each document type and corresponding template. However, in other embodiments, the computer-readable instructions for converting an initial document into an intermediate document may be saved in association with each template.

In accordance with another aspect, a template may be generated through the use of a user interface. More particularly, a user may specify one or more tags to be associated with one or more of a plurality of regions of a first document through the use of a user interface. Through this process, computer-readable instructions for tagging the document may be generated and saved as a template that may executed for tagging other documents (e.g., intermediate documents) of the same document type.

In accordance with one aspect, a template may be generated during the process of tagging a first document and reused to tag a second document. More particularly, a first document in a first format may be obtained. The first document may be parsed to generate an intermediate document that conforms to an intermediate format. A template including computer-readable instructions for converting the intermediate document into an accessible document may be generated. The template may then be executed to convert the first document, as well as a second, different document, into an accessible document. The second document need not be in the same format as the first document. For instance, the first document and the second document may be saved as two different print formats. While the first document and the second document need not be in the same format, they should be of the same type. For instance, the first document and the second document may both be a utility bill.

In accordance with yet another aspect, once a template has been saved, the pre-existing template may be "re-used" to tag other documents of the same document type. In one embodiment, an initial document may be obtained and parsed to generate an intermediate document that conforms to an intermediate format. For example, the initial document may be parsed to identify a plurality of regions of the initial document. The intermediate document may therefore identify the plurality of regions of the initial document, as well as other information pertaining to the plurality of regions of the initial document. An existing template including computer-readable instructions for converting an intermediate document of the document type into an accessible document may be obtained and executed such that an accessible document corresponding to the initial document is generated from the intermediate document.

In accordance with yet another aspect, a plurality of documents of the same document type may be converted to accessible documents using the template that corresponds to that document type. For instance, the plurality of documents may include bank statements to be issued from a particular bank, where each of the bank statements is a statement for a different individual. More particularly, a set of initial documents may be obtained, where each of the set of initial documents is a first document type (e.g., bank statement). Each of the set of initial documents may be parsed to identify a plurality of regions of the corresponding one of the set of initial documents. A template including computer-readable instructions for generating an accessible document including the plurality of regions for the first document type may be obtained and executed such that an accessible document is generated for each of the set of initial documents.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Web Content Accessibility Guidelines (WCAG) are part of a series of Web accessibility guidelines published by the W3C's Web Accessibility Initiative. They consist of a set of guidelines on making content accessible, primarily for disabled users, but also for devices such as highly limited devices, such as mobile phones.

The disclosed embodiments enable an accessible document to be generated from an initial document in accordance with web accessibility guidelines such as WCAG 1.0, published on May 5, 1999, or WCAG 2.0, published on Dec. 11, 2008, which are incorporated herein by reference for all purposes. When printed or viewed via a display, the accessible document may appear to be identical to the initial document. However, the accessible document may be compatible with various accessibility products enabling visually impaired individuals to "read" the accessible document, as will be described in further detail below. Various accessibility products include speech synthesizers (i.e., readers) capable of reading a document, technology that renders hard-copy output into Braille, and Braille devices. In addition, the accessible document may make the content of the initial document accessible to various devices such as mobile phones.

In the following description, the term document may be used to describe an electronic document (e.g., file) or data structure representing a physical document that may be printed or displayed via a suitable medium (e.g., printer or display). The document may include text and/or images (e.g., graphics, photographs, logos, etc.). In addition, the document may include formatting information such as font characteristics (e.g., font size, bold, italics, underline, color, etc.).

The disclosed embodiments may be implemented in software and/or hardware. For example, the software may be implemented in an object-oriented language such as C++ or Java.

Figure 1:
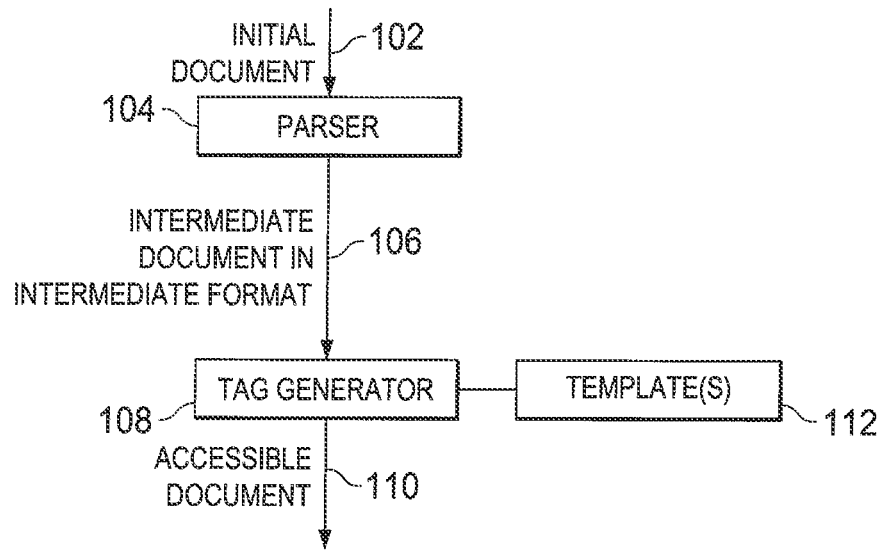
FIG. 1 is a block diagram illustrating an example system in which various embodiments may be implemented.

FIG. 1 is a block diagram illustrating an example system in which various embodiments may be implemented. As shown at 102, an initial document may be received. For example, the initial document may be a bill, book, magazine, newspaper, or article. In addition, the format of the initial document may be one of a variety of formats capable of being parsed and converted to an accessible document via a system such as that described herein. For example, the initial document may include a print stream in one of various print formats such as Advanced Function Printing (AFP), line data, metacode, Printer Command Language (PCL), Portable Document Format (PDF), or TIFF.

Upon receiving the initial document 102, a parser 104 may parse the initial document in order to generate an intermediate document in an intermediate format 106. For example, the intermediate format may be PDF. Moreover, information provided in the intermediate document may be stored in a data structure such as an object (i.e., instantiation of a class) generated in an object-oriented language.

In one embodiment, the parser 104 parses the initial document 102 in order to identify or define a plurality of regions (i.e., sections) within the initial document 102. In this manner, the logical structure of the document may be identified. For example, the regions that are identified may include specific fields, rows, or columns within the initial document 102. Examples of regions that may be identified for a bill include a title, due date of a bill, an amount due, a name of the individual to which the bill is addressed, an address of the individual to which the bill is addressed, and/or one or more line items/rows including text describing an item billed and a corresponding amount billed for the item. Each of the regions may be defined by a rectangular area or a border surrounding the region. Thus, content from each of the identified regions may be extracted. This content may then be used to generate the intermediate document in the intermediate format 106. More particularly, the content may be stored in an intermediate data structure such as an object, which may then be used to generate the intermediate document.

A tag generator 108 may generate an accessible document 110 from the initial document 102 by "tagging" the corresponding intermediate document through the execution of a template. More particularly, the tag generator 108 may tag the intermediate document by inserting one or more tags at various points within the intermediate document. The tags in an accessible document may designate an order of the various fields or regions within the accessible document. This order will be interpreted by an accessibility product as a "reading order," where the order is appropriate for the visually impaired. In this manner, the disclosed embodiments may enable a visually impaired person to better understand the information presented in a variety of documents.

In order to generate a template, an individual may specify tags associated with various identified regions of an initial document or intermediate document via a graphical user interface. More particularly, when the individual chooses to tag an initial document, the initial document may be automatically parsed to generate a corresponding intermediate document. A user interface may be provided to enable the individual to select region(s) within the initial/intermediate document and submit tags to be inserted in association with the selected region(s), resulting in the generation of an accessible document. A set of computer-readable instructions for tagging a document of the same type may be automatically generated as a result of this process. For example, the computer-readable instructions may be generated in a markup language such as Extensible Markup Language (XML). Once all of the tags for the document have been specified, the set of computer-readable instructions may be saved as a template 112. The template 112 may be named and/or associated with a particular type of document. Thus, a first template may be saved in association with a first type of document, while a second template may be saved in association with a second type of document. Various types of documents may include documents generated by a specific company, newspapers, magazines, articles, books, or bills. More particularly, an electric bill generated by an electric company will generally have a different format from a credit card bill generated by a credit card company. In fact, each credit card company may use a different format when generating their credit card statements. Therefore, a different template may be generated in order to convert each of these different types of documents to an accessible document 110. A method of generating a template for converting an initial document to an accessible document will be described in further detail below with reference to FIG. 2.

A template 112 is a reusable component that may include computer-readable instructions for tagging an intermediate document. In some embodiments, the template 112 may also include instructions for parsing an initial document and generating an intermediate document corresponding to the initial document, as described herein.

Assuming that a template has previously been generated and saved as shown at 112, the template 112 may be executed in order to tag another document of the same type. More particularly, the template may correspond to a particular type of the initial document. The type of document may be any form of printable document that contains encoded text and/or images and has a consistent repeating logical structure or layout across many instances of that document type.

When the template is executed in association with the current initial document, the executing template may automatically tag the corresponding intermediate document. Through the execution of the template to tag the intermediate document, the initial document 102 may be "converted" to an accessible document 110. The accessible document 110 may then be output or saved for later retrieval. In one embodiment, the accessible document 110 is a PDF document. A method of converting an initial document to an accessible document using an existing template will be described in further detail below with reference to FIG. 3.

Figure 2:
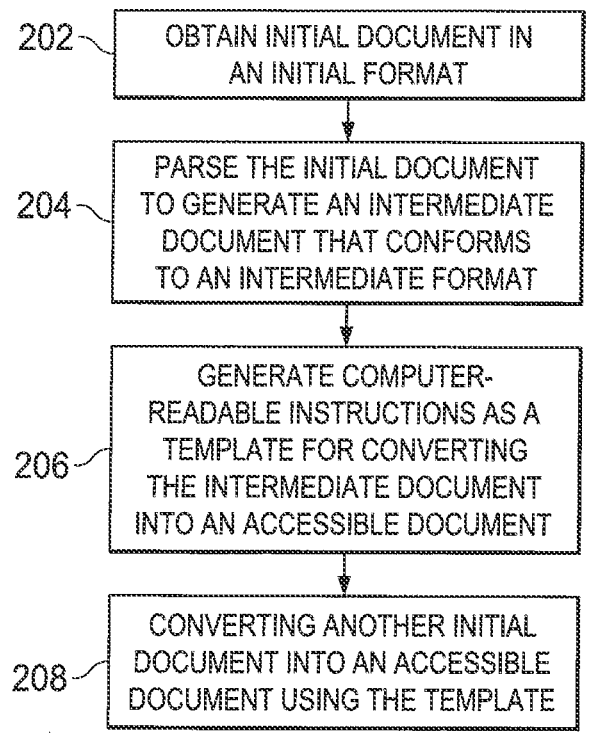
FIG. 2 is a process flow diagram illustrating a method of generating a template for converting an initial document to an accessible document.

FIG. 2 is a process flow diagram illustrating a method of generating a template in accordance with various embodiments of the invention. An initial document in an initial format may be obtained at 202. In one embodiment, the initial document conforms to a print format.

It would be desirable to support the generation of accessible documents from multiple formats. This may be accomplished by parsing an initial document to generate an intermediate document that conforms to an intermediate format at 204. More particularly, a format of the initial document may be identified as one of a plurality of formats for which accessible documents can be generated. One of a plurality of parsers corresponding to the one of the plurality of formats may then parse the initial document according to the format of the initial document. For example, where the initial document conforms to one of a plurality of print formats, a format of the initial document may be identified as one of the plurality of print formats. Parsing of the initial document may then be performed according to the identified print format.

During the parsing process, a plurality of regions of the initial document may be defined or identified. For example, a row of a statement or bill may be identified as a line item of the bill. This may be accomplished despite the variations in size or height of the rows. These regions may be defined by the names of one or more field(s) within the regions and/or physical dimensions of regions within the initial document. The region names and/or content within the regions may be stored in an intermediate data structure. Based upon the identified regions, an intermediate document including the plurality of regions may be generated.

Computer-readable instructions for converting the intermediate document representing the plurality of regions into an accessible document may be generated at 206 via a user interface, as set forth above. A template including the computer-readable instructions may be stored as a template for converting the intermediate document into an accessible document.

The template may then be executed at 208 such that an accessible document corresponding to another, second initial document of the same type is generated. More particularly, the second initial document may be parsed to identify regions within the second initial document, enabling an intermediate document including the identified regions to be generated, as set forth above. The intermediate document corresponding to the second initial document may be automatically tagged as specified in the template in order to generate the accessible document. For example, the accessible document may be a PDF document that conforms to the PDF format.

The accessible document may include a plurality of tags that conform to a set of accessibility standards for generating documents compatible with an accessibility product for visually impaired individuals. The plurality of tags may designate or otherwise indicate an order of a plurality of regions of the accessible document, enabling an accessibility product or other device to relay the information in the tagged regions of the accessible document in the designated order. The designed order of the plurality of regions of the accessible document may be different from an order of the plurality of regions in the initial document. For example, while the amount due region of an initial bill may be present at the end of the bill, the amount due region may be tagged as the first piece of information in an accessible document generated from the initial bill. In this manner, information in a document may be reordered in a manner that is more suited to visually impaired individuals.

Tagging may be performed in accordance with accessibility standards, and therefore may be used in a variety of scenarios. Moreover, readers typically do not understand how to read and interpret non-textual information such as tables, charts, logos, hypertext links, and images. Thus, in order to relay this non-textual information to a visually impaired individual, an accessible document may be tagged with alternate text to replace this non-textual information. An accessibility product may interpret this additional text as alternate text to be "read" or otherwise communicated in place of the information in the corresponding tagged region of the document. As one example, a tag may be used to identify (or replace) an image present in one of the plurality of regions of the initial or intermediate document. Through the use of tagging, a predefined set of text associated with the image may be added to the intermediate document during generation of an accessible document. As another example, a tag indicating a company's name may be added in association with a logo. As yet another example, text such as "Dec. 1, 2010" may be added in association with a date in a format such as "12/01/10." Furthermore, tagging may notify readers that information in a table is presented in rows and columns so that it can be properly delivered and understood by a visually impaired individual. For instance, tagging may identify rows and columns of a table. Text may also be added in association with hypertext links or graphics.

Tagging may also be used to specify a particular language in which the accessible document is to be presented to a user via an accessibility product. For example, the language may be tied to a particular user such as the user of the accessibility product. An accessibility product would therefore be able to communicate information in the accessible document in the specified language.

Figure 3:
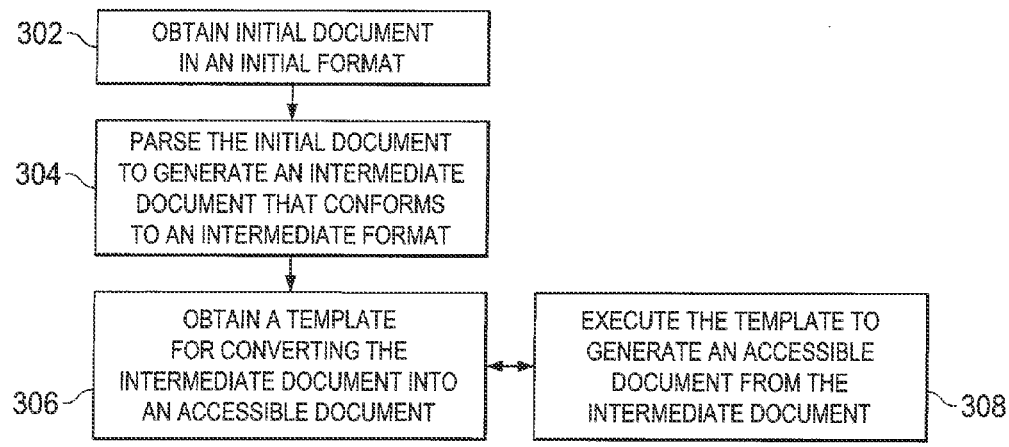
FIG. 3 is a process flow diagram illustrating an example method of executing a template in accordance with various embodiments of the invention.

FIG. 3 is a process flow diagram illustrating a method of executing a template in accordance with various embodiments of the invention. An initial document may obtained at 302. The initial document may be parsed at 304 to generate an intermediate document that conforms to an intermediate format, as set forth above. More particularly, the initial document may be parsed to identify a plurality of regions of the initial document in order to generate the intermediate document. A template for generating an accessible document from the intermediate document may be obtained at 306. The template may then be executed at 308 such that an accessible document is generated from the intermediate document, wherein the accessible document includes a plurality of tags that designate an order of a plurality of regions of the accessible document.

Conversion of a document to an accessible document may be performed on an as-needed basis on demand in response to a request from an individual. For instance, the individual may submit a request for an accessible document corresponding to a particular initial document (or request generation of the accessible document). The request may be received off-line or on-line. For instance, the individual may submit a request via a user interface coupled to a website suitable for generating and/or providing access to accessible documents. In one embodiment, the individual may log in to his or her account via the website in order to generate, view or otherwise obtain an accessible document from his or her account. Thus, the request may indicate an identity of the individual associated with the initial document. Upon receiving the request, the accessible document may be generated and provided to the individual in real-time (e.g., by providing an electronic version such as a PDF of the accessible document for viewing or downloading) or at a later time (e.g., via postal mail). The generation and/or providing of the accessible document may be performed automatically, or upon initiation by a user (e.g., the individual).

Alternatively, conversion of documents to accessible documents may be performed as a batch process to generate a plurality of accessible documents. The accessible documents may be stored for later retrieval. More particularly, each of the accessible documents may be provided in response to a request from an individual, as set forth above.

Figure 4:
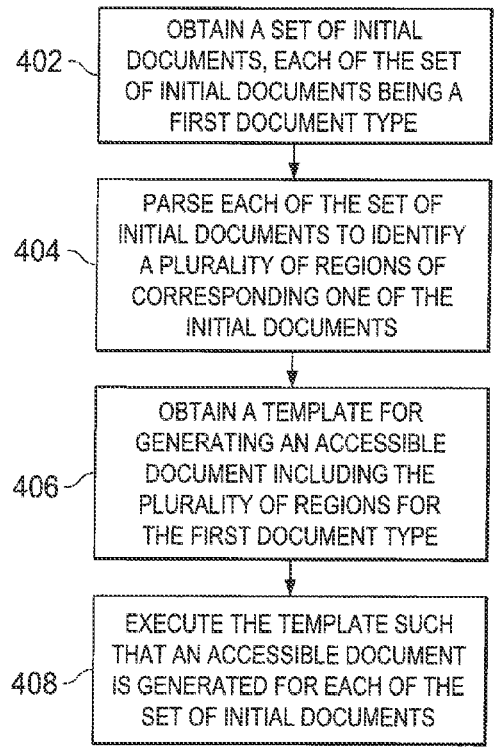
FIG. 4 is a process flow diagram illustrating a method of processing a batch of documents in accordance with various embodiments.

FIG. 4 is a process flow diagram illustrating a method of processing a batch of documents in accordance with various embodiments. A set of initial documents may be obtained at 402, each of the set of initial documents being a first document type. For example, a composition engine may generate a single file including a plurality of documents. The file may then be processed accordingly. More particularly, each of the set of initial documents may be parsed to identify a plurality of regions of the corresponding one of the set of initial documents at 404. A template for generating an accessible document including the plurality of regions for the first document type may be obtained at 406. The template may be executed such that an accessible document is generated for each of the set of initial documents, wherein each accessible document includes a plurality of tags that designate an order of the plurality of regions of the accessible document.

The accessible document that is generated for each of the set of initial documents may be stored such that a plurality of accessible documents are stored. One of the plurality of accessible documents may then be provided in response to a request indicating an identity of an individual associated with the one of the plurality of accessible documents.

The disclosed embodiments may be used advantageously by companies to convert high volume documents such as bills in an efficient manner. Moreover, data formatted for a printer may be captured and transformed into an accessible document. Therefore, organizations may capture data from high-volume print streams and transform it into accessible documents. Through the automation of the generation of accessible documents, organizations can gain a competitive advantage by supporting an underserved consumer segment. Moreover, the ability to generate accessible documents eliminates the need for these organizations to contract with outsourcers to generate accessible documents on a per-document basis.

Figure 5:
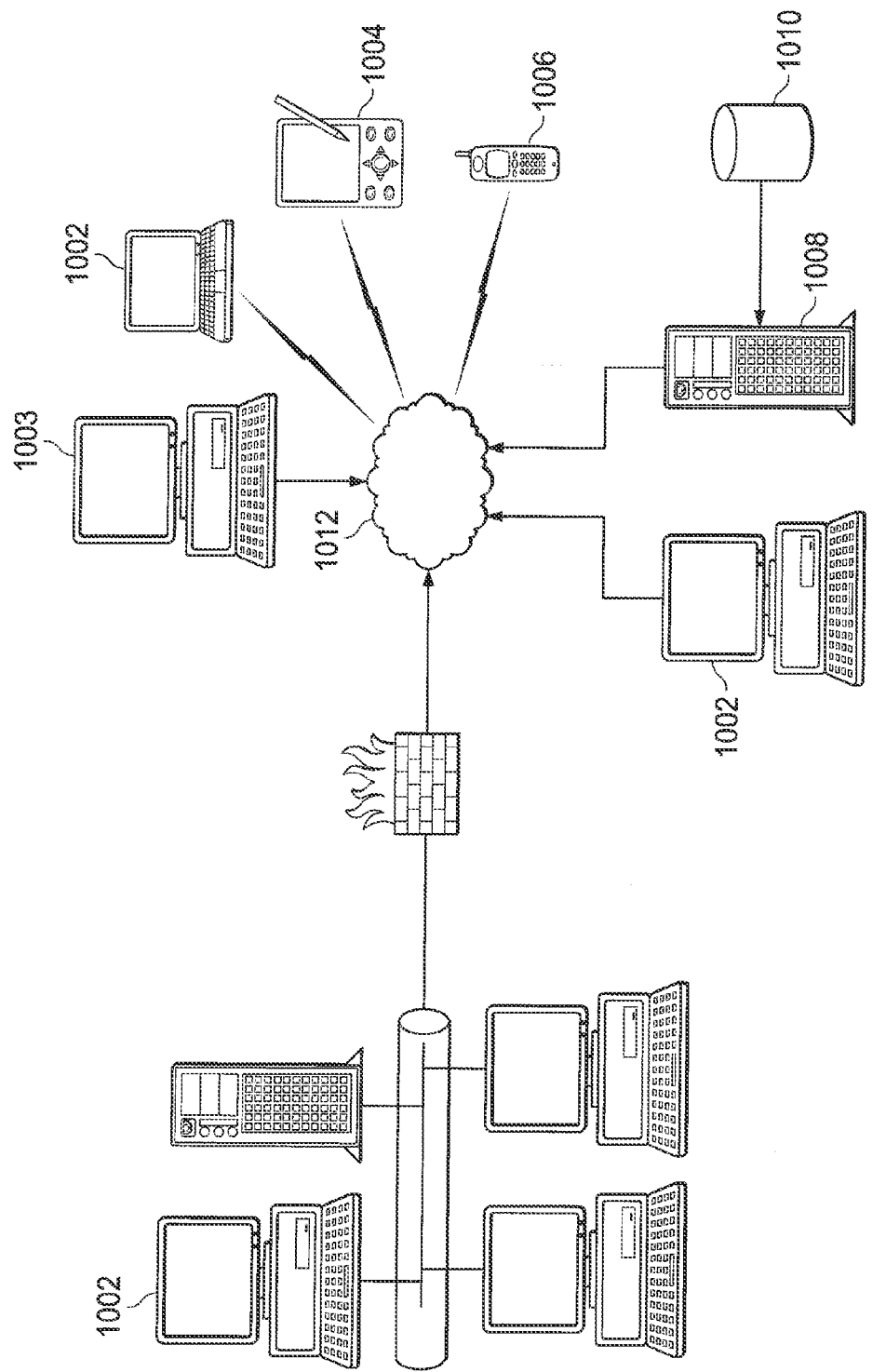
FIG. 5 is a diagram illustrating an example system in which various embodiments may be implemented.

Embodiments of the present invention may be employed to generate accessible documents in any of a wide variety of computing contexts. For example, as illustrated in FIG. 5, implementations are contemplated in which the relevant population of users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

An accessible document may be generated or accessed according to the invention in some centralized manner. This is represented in FIG. 5 by server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store documents being converted to accessible documents, accessible documents, computer-readable instructions for enabling a user to tag documents via a graphical user interface, templates that have been generated as a result of tagging an initial document, computer-readable instructions for generating a graphical user interface enabling a user to tag an initial document or execute a previously generated template for tagging documents, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
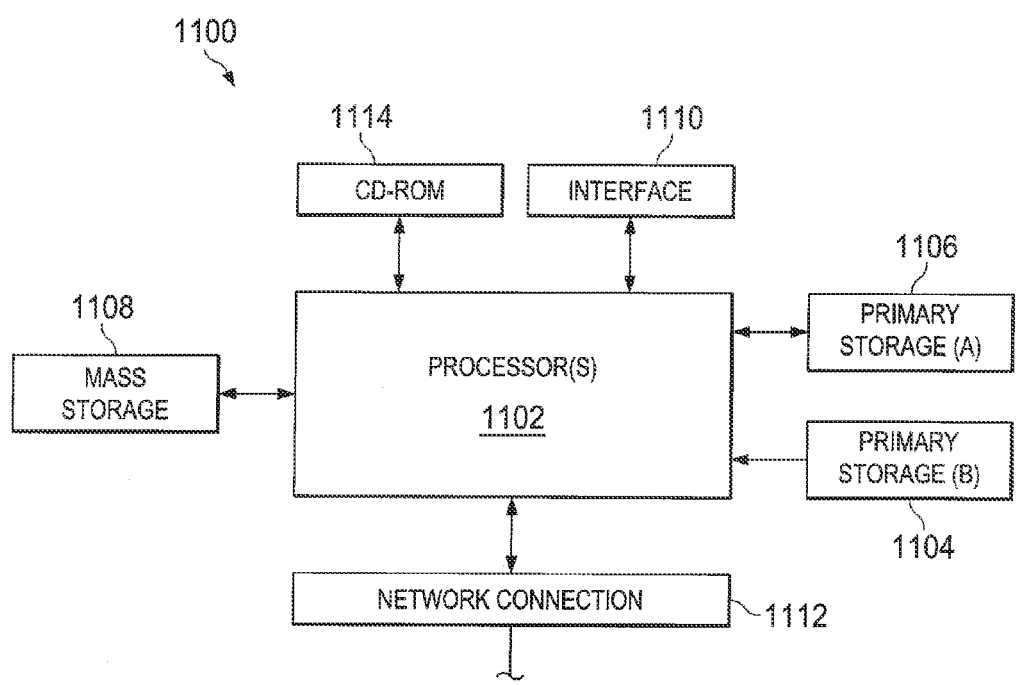
FIG. 6 illustrates an example computer system via which various embodiments may be implemented.

FIG. 6 illustrates a typical computer system that, when appropriately configured or designed, can serve as a system of this invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). CPU 1102 may be of various types including microcontrollers and microprocessors such as programmable devices (e.g., CPLDs and FPGAs) and unprogrammable devices such as gate array ASICs or general purpose microprocessors. As is well known in the art, primary storage 1104 acts to transfer data and instructions uni-directionally to the CPU and primary storage 1106 is used typically to transfer data and instructions in a bi-directional manner. Both of these primary storage devices may include any suitable computer-readable media such as those described above. A mass storage device 1108 is also coupled bi-directionally to CPU 1102 and provides additional data storage capacity and may include any of the computer-readable media described above. Mass storage device 1108 may be used to store programs, data and the like and is typically a secondary storage medium such as a hard disk. It will be appreciated that the information retained within the mass storage device 1108, may, in appropriate cases, be incorporated in standard fashion as part of primary storage 1106 as virtual memory. A specific mass storage device such as a CD-ROM 1114 may also pass data uni-directionally to the CPU.

CPU 1102 may also be coupled to one or more interfaces 1110 that connect to one or more input/output devices such as such as video monitors, track balls, mice, keyboards, microphones, touch-sensitive displays, transducer card readers, magnetic or paper tape readers, tablets, styluses, voice or handwriting recognizers, speakers, accessibility devices such as speech synthesizers (i.e., readers) or Braille devices, or other well-known input devices such as, of course, other computers. Finally, CPU 1102 optionally may be coupled to an external device such as a database or a computer or telecommunications network using an external connection as shown generally at 1112. With such a connection, it is contemplated that the CPU might receive information such as an accessible document from the network, or might output information such as a request for an accessible document to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

The invention claimed is:

1. A method, comprising:
   obtaining a document in an initial format;
   parsing the document to generate an intermediate document that conforms to an intermediate format, wherein the intermediate document defines a plurality of regions;
   accessing a template, wherein the template includes computer-executable instructions for converting the intermediate document into an accessible document; and
   converting the intermediate document into an accessible document using the template, wherein converting the intermediate document to the accessible document includes inserting a plurality of tags into the accessible document, the plurality of tags associated with the plurality of regions in the accessible document to designate a presentation order for the plurality of regions of the accessible document and interpretable by an accessibility product to enable the accessibility product to present content associated with each of the plurality of regions in the accessible document to a user in the designated order without user involvement.

2. The method of claim 1, wherein the intermediate document includes an order of the plurality of regions in the document.

3. The method of claim 2, wherein the presentation order of the plurality of regions designated by the plurality of tags in the accessible document is different from the order of the plurality of regions in the document.

4. The method of claim 3, wherein the plurality of tags are interpretable by the accessibility product to enable the content of the plurality of regions to be presented auditorily by the accessibility product to the user in the designated order.

5. The method of claim 4, wherein the accessible document is configured to be presented visually such that the content of the plurality of regions is presented visually according to the order of the plurality of regions in the document.

6. The method of claim 1, wherein the template includes instructions for parsing the document in the initial format to generate the intermediate document.

7. The method of claim 1, wherein parsing the document includes identifying each of the plurality of regions as an associated area of a page of the document.

8. The method of claim 7, wherein generating the intermediate document includes defining each of the plurality of regions by a border surrounding the associated area of the page of the document.

9. The method of claim 1, wherein the content associated with at least one region of the plurality of regions in the accessible document is a subset of the content in the at least one region in the document.

10. The method of claim 9, wherein converting the intermediate document to the accessible document includes extracting the content associated with the at least one region in the accessible document from the content associated with that region in the intermediate document.

11. The method of claim 10, wherein the content is extracted based on a type of the at least one region.

12. The method of claim 1, wherein at least one region of the plurality of regions is associated with non-textual content in the document and converting the intermediate document includes associating content comprising textual content not present in the document with the at least one region in the accessible document.

13. The method of claim 12, wherein associating content comprising textual information not present in the document includes identifying the non-textual content in the initial document and associating pre-defined textual content for the identified non-textual content with the at least one region in the accessible document.

14. The method of claim 1, further comprising:
receiving a request from the user for the accessible document;
determining an identity of the user; and
converting the document based on the identity of the user, were converting the document based on the identity of the user comprises selecting one or more of the plurality of tags based on the identity of the user.

15. A non-transitory computer readable medium, comprising instructions embodied thereon, the instructions for:
obtaining a document in an initial format;
parsing the document to generate an intermediate document that conforms to an intermediate format, wherein the intermediate document defines a plurality of regions;
accessing a template, wherein the template includes computer-executable instructions for converting the intermediate document into an accessible document; and
converting the intermediate document into an accessible document using the template, wherein converting the intermediate document to the accessible document includes inserting a plurality of tags into the accessible document, the plurality of tags associated with the plurality of regions in the accessible document to designate a presentation order for the plurality of regions of the accessible document and interpretable by an accessibility product to enable the accessibility product to present content associated with each of the plurality of regions in the accessible document to a user in the designated order without user involvement.

16. The computer readable medium of claim 15, wherein the intermediate document includes an order of the plurality of regions in the document.

17. The computer readable medium of claim 16, wherein the presentation order of the plurality of regions designated by the plurality of tags in the accessible document is different from the order of the plurality of regions in the document.

18. The computer readable medium of claim 17, wherein the plurality of tags are interpretable by the accessibility product to enable the content of the plurality of regions to be presented auditorily by the accessibility product to the user in the designated order.

19. The computer readable medium of claim 18, wherein the accessible document is configured to be presented visually such that the content of the plurality of regions is presented visually according to the order of the plurality of regions in the document.

20. The computer readable medium of claim 15, wherein the template includes instructions for parsing the document in the initial format to generate the intermediate document.

21. The computer readable medium of claim 15, wherein parsing the document includes identifying each of the plurality of regions as an associated area of a page of the document.

22. The computer readable medium of claim 21, wherein generating the intermediate document includes defining each of the plurality of regions by a border surrounding the associated area of the page of the document.

23. The computer readable medium of claim 15, wherein the content associated with at least one region of the plurality of regions in the accessible document is a subset of the content in the at least one region in the document.

24. The computer readable medium of claim 23, wherein converting the intermediate document to the accessible document includes extracting the content associated with the at least one region in the accessible document from the content associated with that region in the intermediate document.

25. The computer readable medium of claim 24, wherein the content is extracted based on a type of the at least one region.

26. The computer readable medium of claim 15, wherein at least one region of the plurality of regions is associated with non-textual content in the document and converting the intermediate document includes associating content comprising textual content not present in the document with the at least one region in the accessible document.

27. The computer readable medium of claim 26, wherein .associating content comprising textual information not present in the document includes identifying the non-textual content in the initial document and associating pre-defined textual content for the identified non-textual content with the at least one region in the accessible document.

28. The computer readable medium of claim 15, further comprising:

receiving a request from the user for the accessible document;

determining an identity of the user; and converting the document based on the identity of the user, were converting the document based on the identity of the user comprises selecting one or more of the plurality of tags based on the identity of the user.

29. A system for converting documents, comprising:

a processor; and a computer readable medium, comprising first instructions executable on the processor for:

obtaining a document in an initial format;

parsing the document to generate an intermediate document that conforms to an intermediate format, wherein the intermediate document defines a plurality of regions;

accessing a template, wherein the template includes second computer-executable instructions for converting the intermediate document into an accessible document; and converting the intermediate document into an accessible document using the template, wherein converting the intermediate document to the accessible document includes inserting a plurality of tags into the accessible document, the plurality of tags associated with the plurality of regions in the accessible document to designate a presentation order for the plurality of regions of the accessible document and interpretable by an accessibility product to enable the accessibility product to present content associated with each of the plurality of regions in the accessible document to a user in the designated order without user involvement.

30. The system of claim 29, wherein the presentation order of the plurality of regions designated by the plurality of tags in the accessible document is different from the order of the plurality of regions in the document.

\* \* \* \* \*